United States Patent

[15] 3,642,230

Fleming

[45] Feb. 15, 1972

[54] REWIND AND FAST FORWARD MECHANISM FOR TAPE TRANSPORT

[72] Inventor: Rodney A. Fleming, Remsen, N.Y.

[73] Assignee: General Electric Company

[22] Filed: Mar. 2, 1970

[21] Appl. No.: 15,592

[52] U.S. Cl. ..............................242/201, 242/67.4, 242/75.4

[51] Int. Cl. ..............................G11b 15/32

[58] Field of Search..................242/67.4, 197, 199, 200, 201, 242/202, 204, 205, 207, 75.4; 179/100.2 Z; 274/4 C, 4 D, 11 F, 11 C, 11 E

[56] References Cited

UNITED STATES PATENTS

| | | | |
|---|---|---|---|
| 2,712,448 | 7/1955 | Schroter | 179/100.2 |
| 2,510,409 | 6/1950 | McPhaul | 242/67.4 X |
| 3,130,934 | 4/1964 | Richt et al. | 242/201 |
| 3,130,935 | 4/1964 | Aldridge | 242/204 |
| 3,133,710 | 5/1964 | Herterick | 242/201 |
| 3,501,111 | 3/1970 | Procop | 242/67.4 X |
| 3,533,633 | 10/1970 | Wilder | 242/201 X |

*Primary Examiner*—Stanley N. Gilreath
*Assistant Examiner*—Werner H. Schroeder
*Attorney*—W. J. Shanley, Frank L. Neuhauser, Oscar B. Waddell, Joseph B. Forman and Marvin Snyder

[57] ABSTRACT

A tape transport mechanism for providing forward, rewind and fast forward functions. This mechanism consists basically of two reel carriers which are rotatable about parallel axes; a relatively movable carriage at least in part extending between the reel carriers; motor and drive means, at least part of which is mounted on the movable carriage so that by shifting the carriage, the motor will be selectively connected to one of the reel carriers to drive it; and brake-type tensioning means attached to the carriage and located adjacent to the reel carriers to provide tension on one reel carrier when the other reel carrier is drivingly connected to the motor.

6 Claims, 4 Drawing Figures

INVENTOR:
RODNEY A. FLEMING,

BY William S. Wolfe
HIS ATTORNEY.

INVENTOR:
RODNEY A. FLEMING,
BY William S. Wolfe
HIS ATTORNEY.

REWIND AND FAST FORWARD MECHANISM FOR TAPE TRANSPORT

BACKGROUND OF THE INVENTION

The subject invention relates to the field of tape recorders and, in particular, rewind and fast forward mechanisms for a tape transport.

In most tape recorders it is not only necessary to have the tape pass in a forward direction across the tape heads to record or play back the information stored on it, but it is necessary to be able to rewind the tape back onto the original reel at a reasonably high speed and it is also desirable to have the tape move in a forward direction at a relatively high rate of speed so that the operator can quickly select any portion of the tape to be used. In the past, many different types of mechanism have been used to provide rewind and fast forward functions. However, these mechanisms have generally been quite complicated and hence quite expensive to produce, install and repair.

One problem in regard to drive mechanisms for tape recorders is to maintain proper tension on the tape when the tape is traveling from reel to reel. If too much tension is applied, the tape may be unduly stressed or produce an extremely heavy load on the drive motors. If little or no tension is applied, the tape may not properly contact the heads or may spill out from one of the reels possibly stretching or breaking the tape should it abruptly become tightened. Previous attempts at maintaining proper tension include adjustments of the speed of rotation of the reels relative to one another or providing some type of braking system which acts on the reels. Such mechanisms generally are quite complicated, expensive, and difficult to adjust accurately.

SUMMARY OF THE INVENTION

Accordingly, it is the object of the invention to provide a simple, inexpensive tape drive mechanism for a tape recorder which includes forward, rewind, and fast forward tape functions.

A further object of the invention is to provide an improved tape drive mechanism including rewind and fast forward functions wherein the tape is automatically properly tensioned during any motor driven tape movement.

The above-mentioned objects can be fulfilled by providing a tape drive mechanism comprising two reel carriers rotatable about parallel axes which are a fixed distance apart; a relatively movable carriage extending, at least in part, between the two reel carriers; braking means attached to the movable carrier and located adjacent to each of the reel carriers; an electric motor; and means at least in part connected to the movable carriage for selectively transmitting power to one of the reel carriers and braking the reel carrier that is not being driven by the motor when the movable carriage is shifted. The movable carriage has three main functional positions:

1. the motor directly connected to the takeup reel, (i.e., fast forward);
2. the motor in slipping engagement with the takeup reel, i.e., normal forward (i.e., play/record)
3. the motor directly connected to the supply reel, (i.e., rewind).

The motor may, if desired, additionally be used to rotate the capstan so as to drive the tape through the heads during record or play back.

The subject matter which I regard as my invention is particularly pointed out and distinctly claimed in the concluding portion of the specification.

BRIEF DESCRIPTION OF THE DRAWINGS

The subject invention, however, together with further objects and advantages thereof may be best understood by reference to the following description taken in connection with the accompanying drawing in which.

DESCRIPTION OF THE PREFERRED EMBODIMENT

Figure 1:
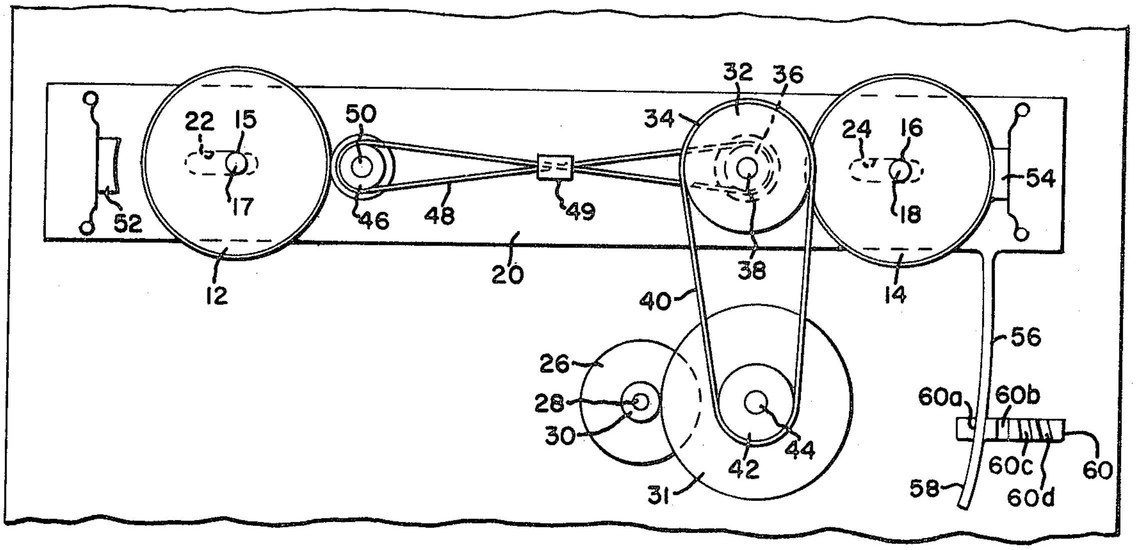
FIG. 1 is a simplified top view of the drive mechanism in accordance with the subject invention in the rewind mode.

In FIG. 1, a top view of the drive mechanism for a tape recorder is shown. A supply reel carrier 12 and takeup reel carrier 14 are freely rotatable on bearings 15, 16 about parallel shafts 17, 18 which are fixedly mounted on the tape recorder frame (not shown) a given distance apart. A supply reel and takeup reel (not shown) may be rigidly connected to their respective reel carriers 12, 14 in known fashion. A movable carriage member 20 has two longitudinally aligned slots 22, 24 through which the shafts 17, 18 of the reel carriers extends so that the carriage 20 may be laterally shifted relative to the reel carriers 12 and 14.

An electric motor 26 is connected to the frame of the tape recorder. The motor 26 has a shaft 28 to which is attached a friction wheel 30. The circumference of the friction wheel 30 engages the circumference of a conventional capstan flywheel 31. The flywheel 31 has a coaxial capstan pulley 42 and a tape-engaging capstan 44 rigidly mounted thereon forming a capstan assembly. A continuous drive belt 40 extends around the capstan pulley 42 and drivingly engages an outer pulley 34 of an intermediate drive hub and pulley member 32. The intermediate pulley member 32 consists of the large diameter outer pulley 34 and a coaxial, small diameter, inner pulley 36. The pulley member 32 is rotatably mounted about a shaft 38 rigidly connected to the carriage 20.

The inner pulley 36 of the intermediate pulley member 32 is connected to a supply hub drive pulley 46 via a crossed belt 48. A belt crossover idler member 49 through which the belt 48 extends is connected to the carriage 20 at the point of belt crossover. The supply hub drive pulley 46 is rotatably mounted about a shaft which is rigidly connected to the carriage 20.

Spring-biased drag brakes 52, 54 are mounted adjacent the outer edges of the reel carriers 12, 14. The shafts 38, 50 of the intermediate and supply hub drive pulleys 32 and 46 respectively are fixed on the carriage 20, a predetermined distance apart. The maximum separation between point on the circumference of pulley 46 and a point on the circumference of pulley 36 is less than the minimum separation between a point on the circumference of reel carrier 12 and a point on the circumference of reel carrier 14. Also, the drag brakes 52, 54 are located a fixed distance apart on the carriage 20 such that when the movable carriage 20 is shifted out of a neutral position to place pulley 46 in contact with the adjacent reel carrier 12, the drag brake 54 for the other reel carrier 14 is in contact with the outer edge of that reel carrier and the drag brake associated with the first mentioned reel carrier 12 is out of contact with that carrier. The greater the amount of lateral shift in one direction or the other from the neutral position, the greater the pressure will be between the driving pulley and its associated reel carrier so that a greater amount of torque is transmitted to the carrier and a greater amount of braking torque is transmitted to the other carrier.

Means such as a lever 56 having an end portion 58 is rigidly connected to the carriage 20. A grooved member 60 is fixed to the frame and has a plurality of grooves 60 *a*, *b*, *c*, *d* therein into which the end portion 58 of the lever 56 may be selectively positioned to correspondingly position the carriage 20 in the desired functional position. In practice the carriage 20 is provided with suitable spring biasing means (not shown) which in conjunction with the grooved member 60 retain the carriage in the selected position. Groove 60*a* corresponds to a fast rewind function. Groove 60*b* corresponds to the carriage 20 being in a neutral (i.e., pause) position. Groove 60*c* corresponds to a normal forward (i.e., play/record) position. Groove 60*d* corresponds to a fast forward position.

When the lever portion 58 is moved into groove 60*a*, as shown in FIG. 1, the carriage 20 slides towards the supply reel carrier 12 so that the supply hub drive pulley 46 is placed into direct frictional engagement with the outer edge of the supply reel carrier 12. The belt and pulley mechanisms are arranged so that when this occurs the supply reel carrier 12 is rotate in a clockwise direction so as to quickly rewind a magnetic tape on the supply reel connected to the reel carrier 12 while the drag brake 54 engages the takeup reel carrier 14 to provide proper tension on the magnetic tape while the tape is being rewound.

Figure 2:
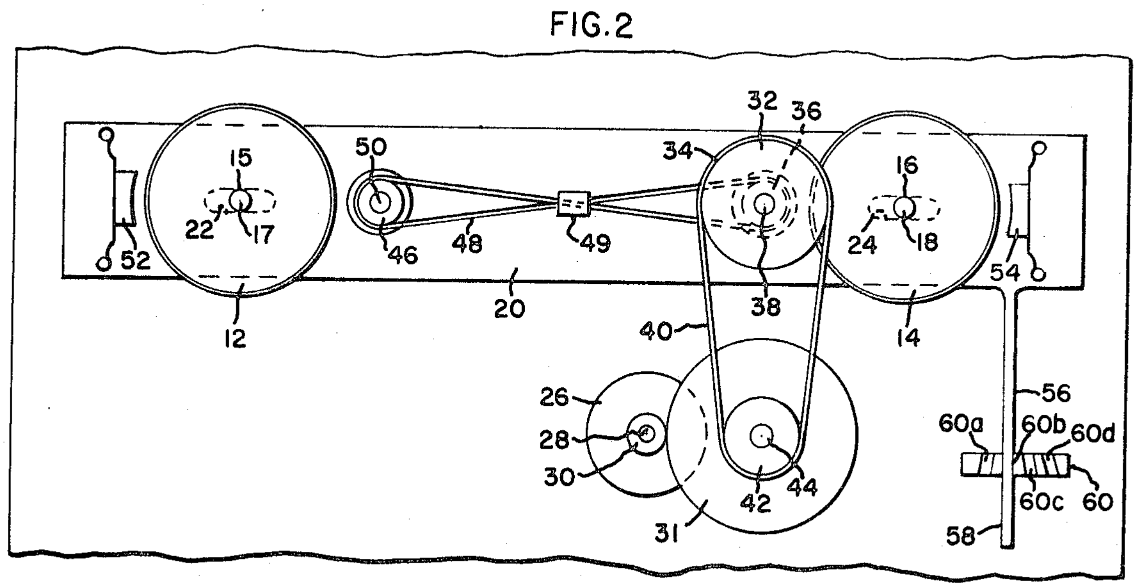
FIG. 2 is a simplified top view of the drive mechanism in the neutral, (i.e., pause) mode.

When the lever portion 58 is positioned in groove 60*b*, (FIG. 2) neither of the pulleys 36, 46 contact their respective carriers 12, 14 so that the tape is not driven in either direction.

Figure 3:
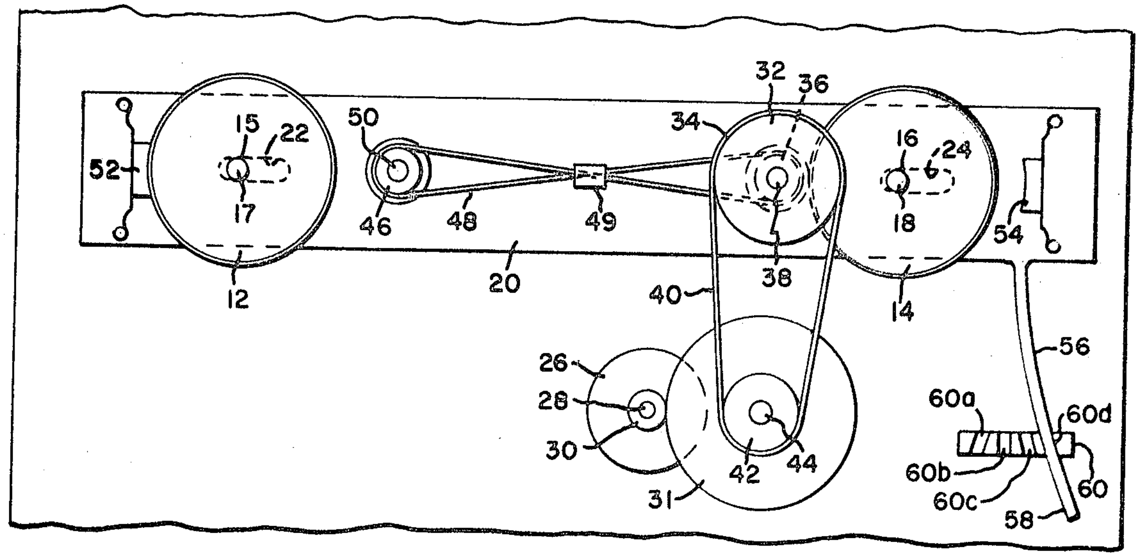
FIG. 3 is a simplified top view of the drive mechanism in the fast forward mode.

When the lever portion 58 is shifted into groove 60*d*, FIG. 3) the carriage 20 moves toward the takeup reel carrier 14 as far as possible, the inner pulley 36 of the intermediate pulley member 32 is brought into direct frictional engagement with the outer edge of the takeup reel carrier 14 to transfer a maximum amount of torque to the carrier 14 so as to effect a rapid forward movement of the tape onto a takeup reel connected to the carrier 14 and the drag brake 52 is brought into engagement with the outer edge of the supply reel carrier 12 to provide proper tensioning during this fast forward mode. In either the fast forward or rewind modes, suitable means may be provided to position the tape out of contact with the capstan to prevent undue wear on the tape.

Figure 4:
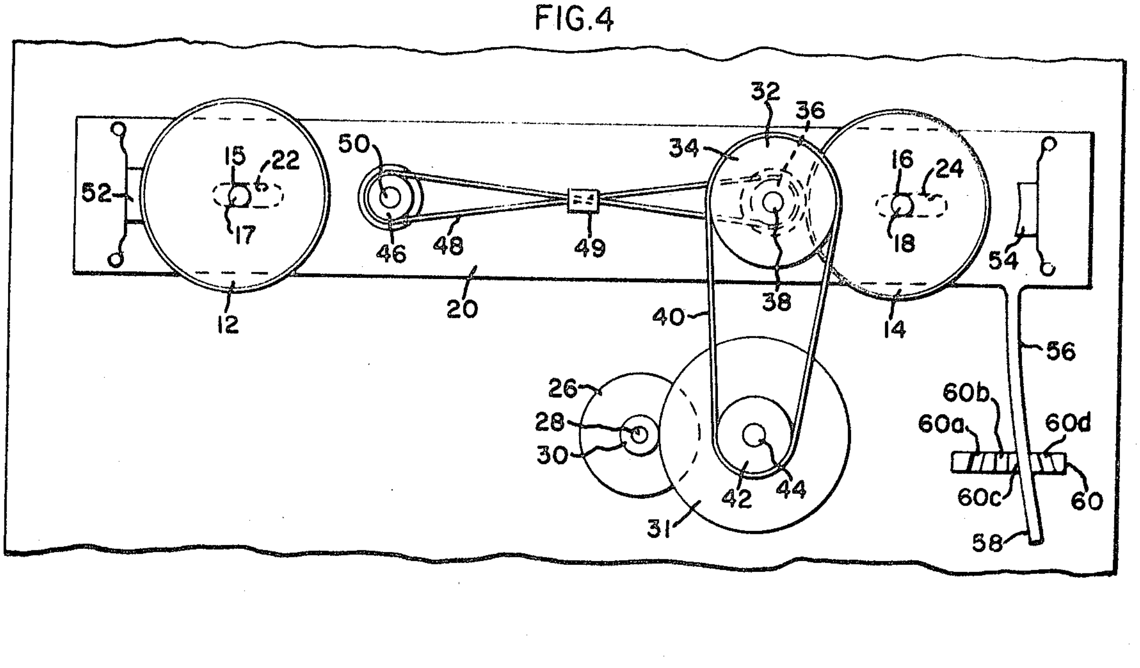
FIG. 4 is a simplified top view of the drive mechanism in the normal forward (i.e., play/record) mode.

The carriage 20 can also be moved no quite as close to takeup reel carrier 14 as when in the fast forward mode by means of shifting the lever portion 58 to groove 60*c*, (FIG. 4) to a position where the outer edge of the inner pulley 36 of the intermediate pulley member 32 engages the outer edge of the takeup reel carrier 14 in slipping engagement therewith to provide a slight forward tension on the tape while the drag brake 52 engages the supply reel carrier 12 to provide a slight tension. During this mode, which is the normal forward, (i.e., play/record) mode, the tape is in contact with the capstan thereby causing the tape to move at the speed determined by the capstan and the takeup reel has a slight torque applied to is so as to effect proper tensioning of the tape.

If desired, the outer edges of the reel carriers 12 and 14 may have a circumferential layer of a high friction, resilient material, such as felt or cork, to provide the desired frictional engagement with its mating drive pulley 46, 36.

Also, if desired, a separate motor may be provided to drive each of the drive pulleys 36, 46 and/or a separate motor may also be provided to drive the capstan.

Thus, the subject invention provides a tape transport mechanism which is simple and inexpensive to manufacture and assemble, can be used in either a small or a large tape recorder, is easy to operate, and provides all necessary or desirable modes (functions) of a transport drive mechanism for a tape recorder.

It is fully intended that many modifications may be made to the disclosed tape transport mechanism which do not depart from the scope of the subject invention. Accordingly, the scope of the subject invention is to be construed only in regard to the appended claims.

What I desire to secure by Letters Patent of the United States is:

1. In a drive mechanism for a tape recorder including a pair of rotatable reel carriers, electric motor means for supplying rotational motion, and drive transmitting means for selectively connecting said motor means to one of said carriers, the improvement comprising:

a carriage laterally shiftable with respect to the axes of rotation of said reel carriers, extending at least in parı between said pair of reel carriers;

a pair of drive members spaced apart from each other by a fixed distance and forming part of said drive transmitting means said drive members being drivingly connected to said motor means so as to rotate in opposite directions, each of said drive members being mounted on said carriage adjacent a respective one of said reel carriers;

means cooperating with said carriage for selectively shifting said carriage to a plurality of predetermined positions, said predetermined positions, said predetermined positions including a first position where one of said drive members in in direct driving engagement with one of said reel carriers and the other drive member is displaced away from the other of said reel carriers, a second position where said one drive member is displaced away from said one reel carrier and said other drive member is in low-pressure driving engagement with said other reel carrier; and a third position where said one drive member is further displaced away from said one reel carrier than when said carriage is in said second position and said other drive member is in direct, high-pressure engagement with said other reel carrier;

and brake means for applying a braking torque to either of said reel carriers when the remaining reel carrier is in driving engagement with one of said drive means.

2. A drive mechanism as in claim 1 wherein said carriage may be shifted to a neutral position so that both of said drive members are displaced from said reel carriers, said brake means is mounted on said carriage adjacent each of said reel carriers and provides frictional engagement with either of said reel carriers when said carriage is at a position closer to the remaining reel carrier than the neutral position, and said first position of said carriage is located closer to said one reel carrier than said neutral position and said second and third positions of said carriage are located closer to said other reel carrier than said neutral position.

3. A drive mechanism as in claim 2 wherein each of said drive members is a pulley, each said pulley being drivingly connected to the other.

4. A drive mechanism as in claim 2 further including a capstan and connected capstan flywheel which are drivingly connected to said motor means.

5. A drive mechanism as in claim 4 wherein said motor means consists of one electric motor.

7. A drive mechanism as in claim 3 wherein both of said reel carriers have a circumferential outer layer of a resilient friction material.

* * * * *